United States Patent
Maher, IV et al.

(10) Patent No.: US 9,109,725 B2
(45) Date of Patent: Aug. 18, 2015

(54) CONDUCTOR BEND RESTRICTOR

(75) Inventors: James V. Maher, IV, Houston, TX (US); Lyle David Finn, Sugar Land, TX (US)

(73) Assignee: HORTON WISON DEEPWATER, INC., Houston, TX (US)

(*) Notice: Subject to any disclaimer, the term of this patent is extended or adjusted under 35 U.S.C. 154(b) by 45 days.

(21) Appl. No.: 13/608,565

(22) Filed: Sep. 10, 2012

(65) Prior Publication Data
US 2013/0239866 A1   Sep. 19, 2013

Related U.S. Application Data

(60) Provisional application No. 61/532,792, filed on Sep. 9, 2011.

(51) Int. Cl.
| | | |
|---|---|---|
| E21B 17/01 | (2006.01) | |
| F16L 3/12 | (2006.01) | |
| B63B 35/44 | (2006.01) | |

(52) U.S. Cl.
CPC . *F16L 3/12* (2013.01); *B63B 35/44* (2013.01); *E21B 17/017* (2013.01)

(58) Field of Classification Search
CPC .............................. E21B 17/017; F16L 3/12
USPC ..................... 166/367, 350, 355, 378, 241.6; 405/168.1, 168.2, 232, 249
See application file for complete search history.

(56) References Cited

U.S. PATENT DOCUMENTS

| | | | | |
|---|---|---|---|---|
| 3,142,343 A | * | 7/1964 | Otteman et al. | 175/7 |
| 3,142,344 A | * | 7/1964 | Otteman et al. | 175/7 |
| 3,352,357 A | * | 11/1967 | Van Eek | 166/355 |
| 3,605,413 A | * | 9/1971 | Morgan | 405/211 |
| 3,851,483 A | * | 12/1974 | Holley, Jr. | 405/232 |
| 4,126,183 A | * | 11/1978 | Walker | 166/338 |
| 4,185,694 A | * | 1/1980 | Horton | 166/350 |
| 4,188,156 A | * | 2/1980 | Fisher et al. | 405/224.3 |
| 4,240,506 A | * | 12/1980 | Dareing | 166/367 |
| 4,248,549 A | * | 2/1981 | Czerewaty | 405/224 |
| 4,256,417 A | * | 3/1981 | Bohannon | 405/224.2 |
| 4,529,334 A | * | 7/1985 | Ortloff | 405/224.2 |
| 4,633,801 A | * | 1/1987 | Marshall | 114/266 |
| 4,740,109 A | * | 4/1988 | Horton | 405/224.2 |
| 4,741,647 A | * | 5/1988 | Dumazy et al. | 405/224.4 |

(Continued)

FOREIGN PATENT DOCUMENTS

| | | | | | |
|---|---|---|---|---|---|
| GB | | 2102044 A | * | 1/1983 | E21B 17/01 |

OTHER PUBLICATIONS

PCT/US2012/054464 International Search Report and Written Opinion Dated Jan. 30, 2013 (9 p.).

(Continued)

*Primary Examiner* — Matthew Buck
(74) *Attorney, Agent, or Firm* — Conley Rose, P.C.

(57) ABSTRACT

An offshore system for drilling or production includes a buoyant hull. In addition, the offshore system includes a topside mounted to the hull and positioned above the surface of the water. Further, the offshore system includes a conductor having a lower end disposed in the sea bed below the sea floor and an upper end coupled to the topside. Still further, the offshore system includes a bend restrictor disposed about the conductor. The bend restrictor has a lower end positioned in the sea bed below the sea floor and an upper end positioned above the sea floor.

20 Claims, 18 Drawing Sheets

(56) References Cited

U.S. PATENT DOCUMENTS

| | | | |
|---|---|---|---|
| 4,854,781 A * | 8/1989 | Sparks et al. | 405/224.4 |
| 5,028,171 A * | 7/1991 | Gray | 405/225 |
| 5,447,390 A * | 9/1995 | Sparks et al. | 405/195.1 |
| 5,873,677 A * | 2/1999 | Davies et al. | 405/195.1 |
| 6,027,286 A | 2/2000 | Pollack | |
| 6,659,690 B1 * | 12/2003 | Abadi | 405/224.2 |
| 7,347,225 B2 | 3/2008 | Nobileau | |
| 7,527,455 B2 * | 5/2009 | Raines | 405/228 |
| 8,430,170 B2 * | 4/2013 | Pionetti | 166/350 |
| 8,474,539 B2 * | 7/2013 | Luo et al. | 166/367 |
| 2004/0065475 A1 * | 4/2004 | Laursen et al. | 175/7 |
| 2008/0044233 A1 | 2/2008 | O'Sullivan | |
| 2008/0283248 A1 | 11/2008 | Askestad | |
| 2009/0123235 A1 * | 5/2009 | Maconochie et al. | 405/227 |
| 2011/0178730 A1 | 7/2011 | Mangal et al. | |
| 2013/0239867 A1 | 9/2013 | Horton | |

OTHER PUBLICATIONS

PCT/US2012/054429 International Search Report and Written Opinion Dated Feb. 28, 2013 (11 p.).

* cited by examiner

CONDUCTOR BEND RESTRICTOR

CROSS-REFERENCE TO RELATED APPLICATIONS

This application claims benefit of U.S. provisional patent application Ser. No. 61/532,792 filed Sep. 9, 2011, and entitled "Conductor Bend Restrictor," which is hereby incorporated herein by reference in its entirety.

STATEMENT REGARDING FEDERALLY SPONSORED RESEARCH OR DEVELOPMENT

Not applicable.

BACKGROUND

1. Field of the Invention

The invention relates generally to subsea conductors. More particularly, the invention relates to devices to restrict subsea conductors from bending while optimizing the distribution of stresses between the device and the conductor.

2. Background of the Technology

Offshore platforms are commonly used to drill and produce subsea wells. Some offshore platforms such as jackup rigs are directly anchored to the sea floor, whereas other offshore platforms (e.g., as semi-submersibles platforms, spar platforms, and tension leg platforms) float on the sea surface and are moored to the sea floor. In both cases, various conductors such as pipes, flow lines, tendons, and the like extend from the sea floor to the platform at the sea surface. The upper end of the conductors is typically fixed to the platform and the lower end (or a lower portion of the conductor) is fixed to the sea floor or other device at the sea floor.

During offshore operations, a platform continuously moves in response to winds, waves, and currents. Since the upper ends of the conductors are secured to the platform, the portion of the conductor extending from the sea floor (or device at the sea floor) to the platform moves with the platform. Consequently, the upper portion of the conductor pivots or bends relative to the lower end or portion of the conductor secured to the sea floor. Such bending of the conductor induces undesirable stresses in the conductor that may fatigue and/or weaken the conductor over time.

Accordingly, there remains a need in the art for devices that restrict bending of subsea conductors to manage bending stresses induced in the conductors.

BRIEF SUMMARY OF THE DISCLOSURE

These and other needs in the art are addressed in one embodiment by an offshore system for drilling or production. In an embodiment, the offshore system includes a buoyant hull. In addition, the offshore system includes a topside mounted to the hull and positioned above the surface of the water. Further, the offshore system includes a conductor having a lower end disposed in the sea bed below the sea floor and an upper end coupled to the topside. Still further, the offshore system includes a bend restrictor disposed about the conductor. The bend restrictor has a lower end positioned in the sea bed below the sea floor and an upper end positioned above the sea floor.

These and other needs in the art are addressed in another embodiment by a method for reducing bending stresses in a subsea conductor. In an embodiment, the method includes penetrating the sea floor with a bend restrictor. The bend restrictor has an upper end disposed above the sea floor and a lower end disposed below the sea floor. In addition, the method includes extending the conductor through a bend restrictor. Further, the method includes radially spacing the bend restrictor from the conductor. Still further, the method includes bending the conductor. Moreover, the method includes restricting bending of the conductor with the restrictor.

These and other needs in the art are addressed in another embodiment by bend restrictor for restricting bending of a conductor extending into the sea floor. In an embodiment, the bend restrictor includes a sleeve disposed about the conductor. The sleeve has a lower end positioned in the sea bed below the sea floor and an upper end positioned above the sea floor. The sleeve has an inner diameter greater than an outer diameter of the conductor. The sleeve has a first portion extending from the sea floor to the upper end and a second portion extending from the sea floor to the lower end. The first portion has a first axial length and the second portion has a second axial length that is the same as the first axial length.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
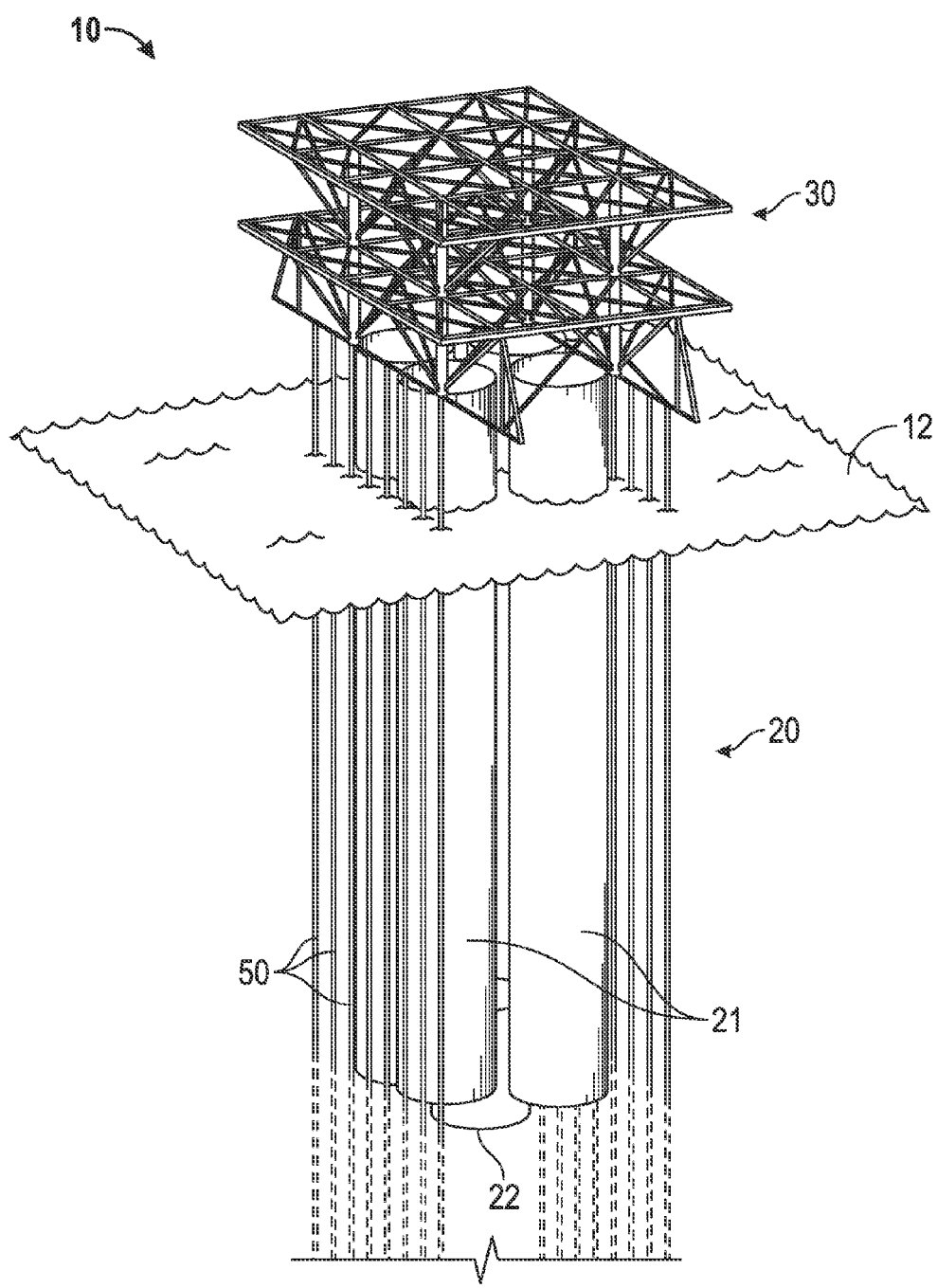
FIG. 1 is a perspective view of an embodiment of an offshore structure and a plurality of conductors extending from the sea floor to the offshore structure.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 2:
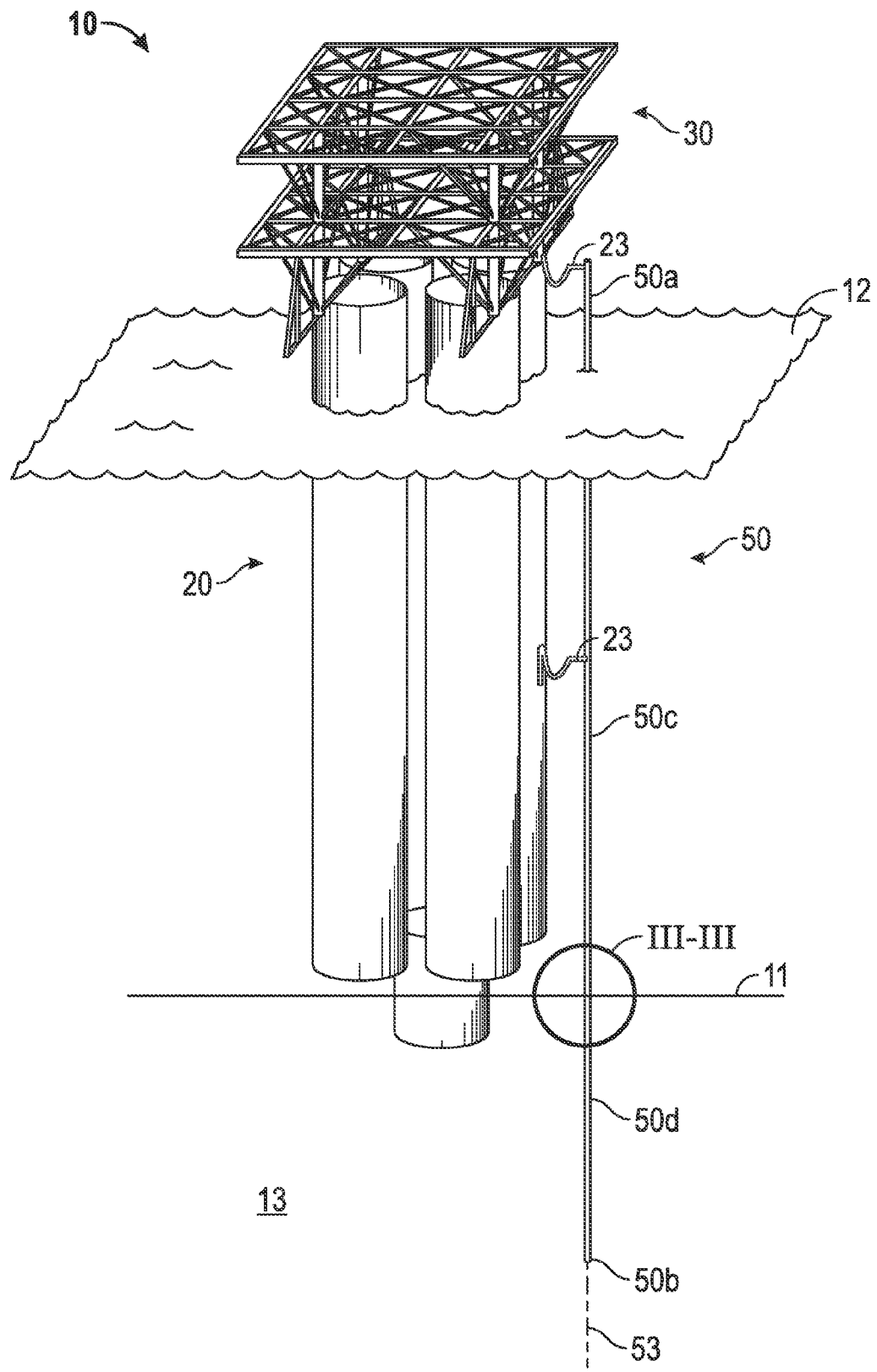
FIG. 2 is a front perspective view of the offshore structure and a single conductor of FIG. 1.

Referring now to FIGS. 1 and 2, an embodiment of an offshore structure 10 is shown. Structure 10 is configured to drill and produce hydrocarbons in an offshore environment. Structure 10 comprises a ballast adjustable hull 20 and a topside or deck 30 mounted to hull 20. Hull 20 extends from the sea floor 11 through the sea surface 12. Thus, deck 30 is positioned above the sea surface 12. Hull 20 comprises a plurality of cylindrical columns 21 coupled together and an anchor 22 (e.g., a suction pile) embedded in the sea floor 11. A plurality of conductors 50 extend from the sea floor 12 to deck 30. For purposes of clarity, only one conductor 50 is shown in FIG. 2.

In this embodiment, the exemplary offshore structure 10 shown in FIGS. 1 and 2 is a buoyant tower as disclosed in U.S. Patent Application No. 61/394,646, filed Oct. 19, 2010 and entitled "Buoyant Tower," which is hereby incorporated herein by reference in its entirety for all purposes. However, in general, structure 10 may be any offshore structure such as a semi-submersible platform, a spar platform, or a tension leg platform.

Figure 6:
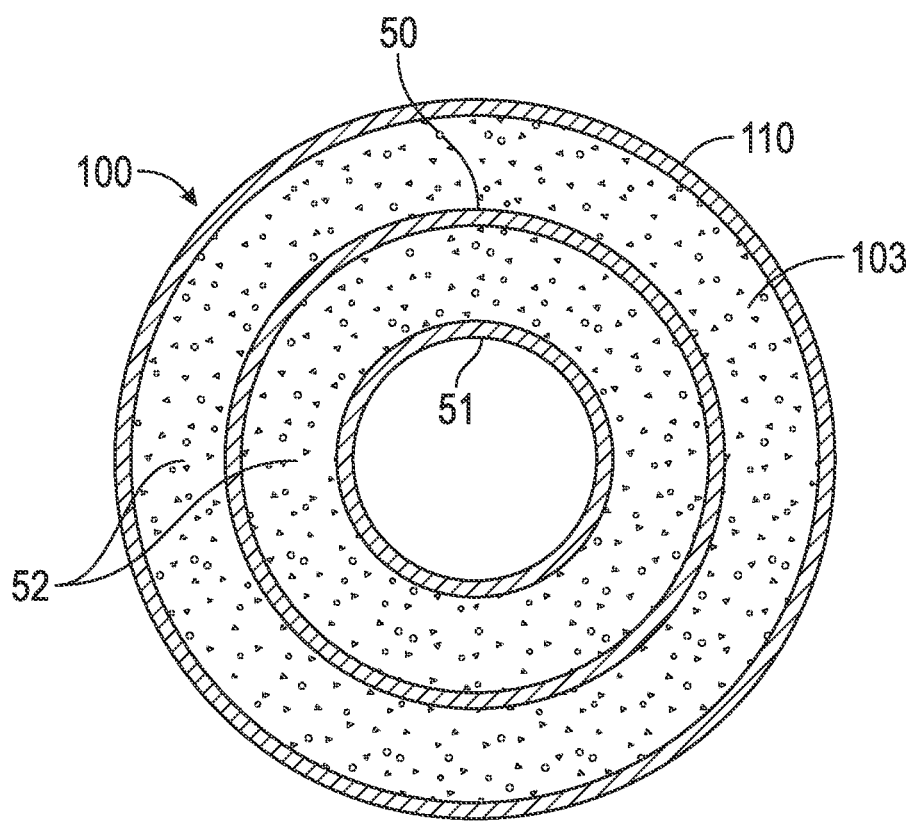
FIG. 6 is a cross-sectional view of the bend restrictor and the conductor of FIG. 3 taken along section VI-VI.

Referring now to FIG. 2, each conductor 50 penetrates the sea floor 11 and has a central or longitudinal axis 53, a first or upper end 50a coupled to hull 20, a second or lower end 50b opposite end 50a. Upper end 50a is disposed above the sea surface 12 and lower end 50b is disposed in the sea bed 13 (i.e., disposed below the sea floor 11). Thus, each conductor 50 may be described as having a first or upper portion 50c extending upward from the sea floor 11 to upper end 50a, and a lower portion 50d extending downward from the sea floor 11 through the sea bed 13 to lower end 50b. As best shown in FIG. 6, in this embodiment, each conductor 50 comprises at least one steel tubular 51 such as steel casing or steel riser. In FIG. 6, conductor 50 includes a pair of coaxially aligned, radially-spaced, nested tubulars 51. The radial spacing of tubulars 51 results in an annulus therebetween, which, in this embodiment, is filled with a rigid material 52. In this embodiment, material 52 is grout or cement. In general, each conductor 50 may have any outer diameter, however, for many applications (but not necessarily all applications), conductor 50 has an outer diameter between 10.0 in. and 25.0 in.

Referring again to FIG. 2, the upper portion 50c of each conductor 50 is coupled to hull 20 at several locations along its length. In particular, the upper portion 50c of each conductor 50 is coupled to hull 20 at a plurality of axially spaced locations via guide frames 23 extending laterally from hull 20. Each conductor 50 extends through each guide frame 23, which maintains the general spacing and arrangement of the plurality of conductors 50. Thus, as structure 10 moves in response to environmental loads (e.g., wind, waves, currents, etc.), the upper portion 50c of each conductor 50 moves laterally with structure 10, whereas the lower portion 50d of each conductor 50 disposed in the sea bed 13 remains fixed. Consequently, each conductor 50 bends at or near the sea floor 11 (i.e., at the intersection of portions 50c, d) as structure 10 (and upper portions 50c coupled thereto) move in response to environmental loads. Such bending induces bending stresses in each conductor 50. These stresses can lead to failures in conductors 50, either through surpassing the ultimate yield strength of the conductor or through fatigue wear. To manage bending stresses in conductors 50, a bend restrictor 100 is disposed about each conductor 50 at the sea floor 11 where bending stresses are expected to be the greatest.

Figure 3:
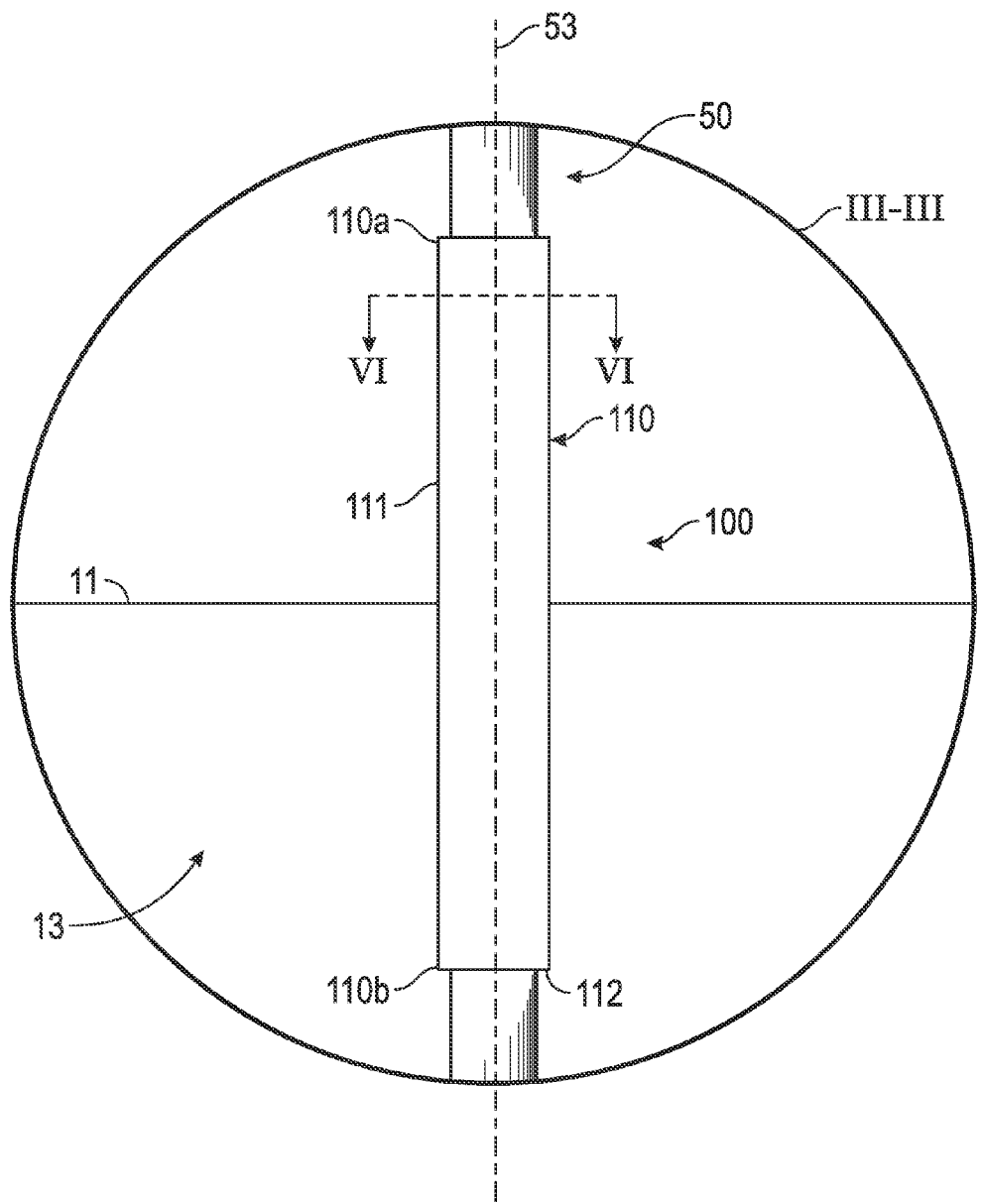
FIG. 3 is an enlarged front view of section of FIG. 2 illustrating the conductor and an embodiment of a bend restrictor in accordance with the principles described herein disposed about the conductor.
Figure 4:
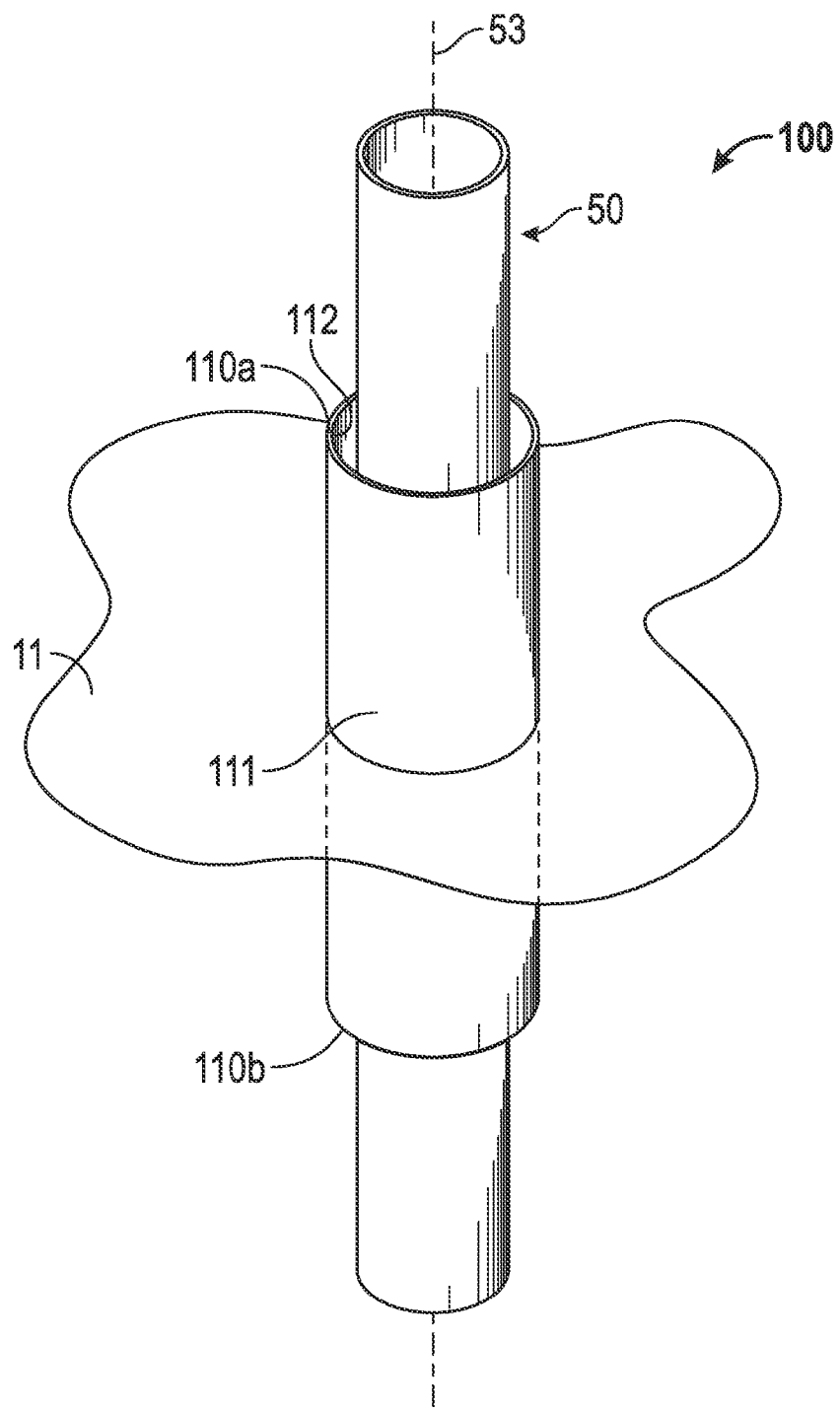
FIG. 4 is an prospective view of the bend restrictor and the conductor of FIG. 3.
Figure 5:
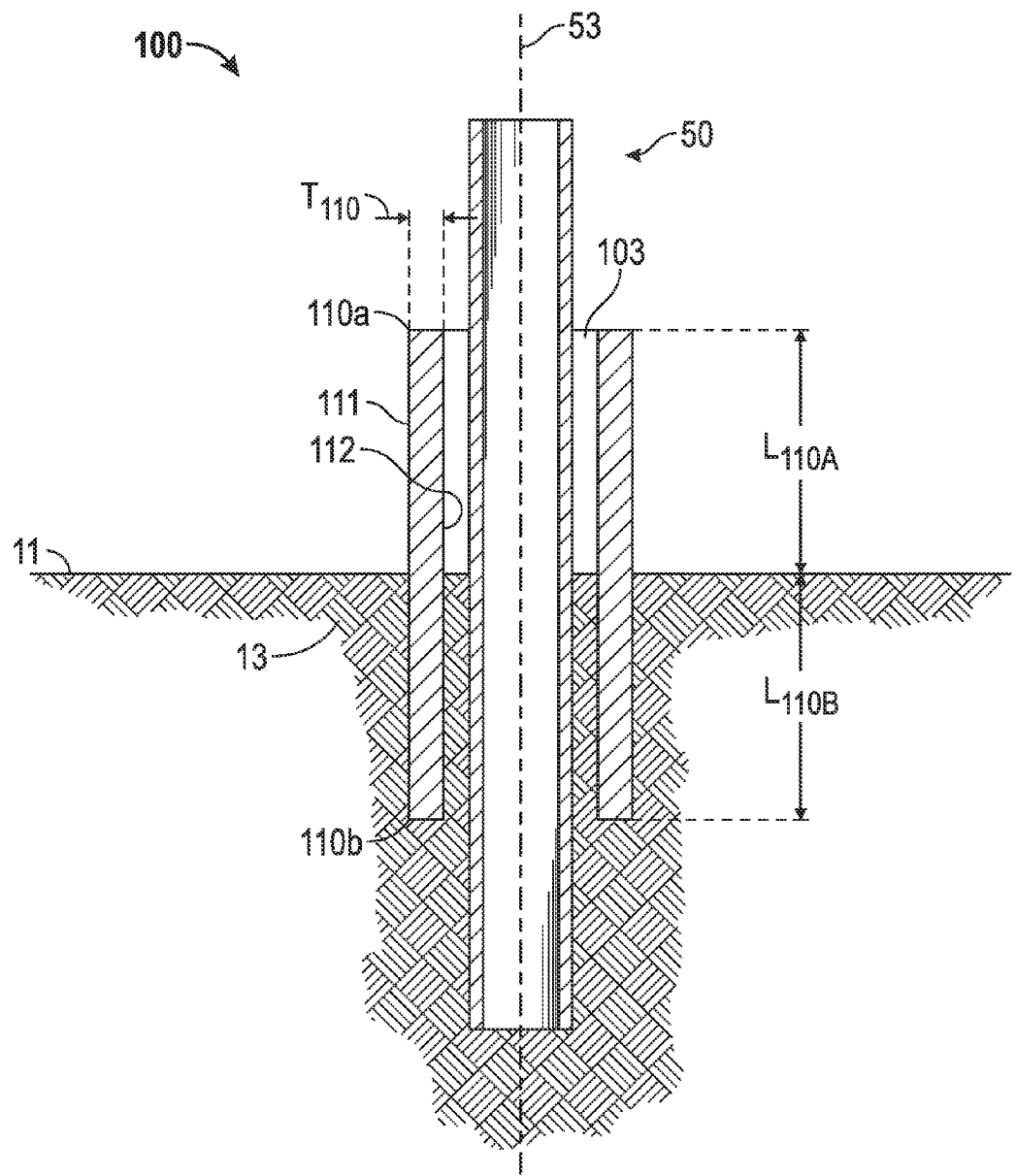
FIG. 5 is an front cross-sectional view of the bend restrictor and the conductor of FIG. 3.

Referring now to FIG. 3-5, one bend restrictor 100 is shown disposed about one conductor 50, it being understood that one bend restrictor 100 is disposed about each conductor 50. In general, each bend restrictor 100 functions to strengthen the associated conductor 50 at the sea floor 11 (i.e., at the location where conductor 50 is subjected to the greatest bending stress). One bend restrictor 100 will now be described it being understood that each bend restrictor 100 is the same. In this embodiment, bend restrictor 100 comprises a cylindrical sleeve 110 disposed about conductor 50. In particular, sleeve 110 is coaxially aligned with conductor 50 and has a first or upper end 110a disposed above the sea floor 11, a second or lower end 110b disposed below the sea floor 11 (i.e., disposed in the sea bed 13), a cylindrical outer surface 111 extending between ends 110a, b, and a cylindrical inner surface 112 extending between ends 110a, b. In addition, as best shown in FIG. 5, a first or upper portion of sleeve 110 has a length $L_{110A}$ measured axially from the sea floor 11 to upper end 50a, and a second or lower portion of sleeve 110 has a length $L_{110B}$ measured axially from the sea floor 11 to lower end 110b. Thus, the total axial length of sleeve 110, and hence bend restrictor 100, is the sum of lengths $L_{110A}$, $L_{110B}$. Sleeve 110 has a thickness $T_{110}$ measured radially between surfaces 111, 112. In this embodiment, thickness $T_{110}$ is constant and uniform moving axially between ends 110a, b.

Referring to FIGS. 5 and 6, the inner diameter of sleeve 110 is greater than the outer diameter of conductor 50, thereby resulting in an annulus 103 disposed radially between sleeve 110 and conductor 50. In this embodiment, annulus 103 is filled with cement or grout 52; however, in other embodiments, annulus 103 may be left empty (e.g., filled only with sea water above the sea floor 11 and soil below the sea floor 11) or filled with other materials (e.g., resilient materials such as elastomeric materials or other rigid materials).

In general, the size and geometry of sleeve 100 (e.g., thickness $T_{110}$, total length and lengths $L_{110A}$, $L_{110B}$, outer diameter and inner diameter, etc.) and the size of annulus 103 will depend on the particular application, and are generally chosen based on a variety of factors including, without limitation, environmental conditions, the desired combined stiffness of the conductor 50 and bend restrictor 100, the Young's modulus of bend restrictor 100 and the conductor 50, and the dimensions of the conductor 50 and bend restrictor 100. For most applications, axial lengths $L_{110A}$, $L_{110B}$ of sleeve 110 are each preferably between 10 and 100 ft., more preferably between 20 and 75 ft., and even more preferably 50 ft. Additionally, the axial length $L_{110A}$ is preferably about the same as the axial length $L_{110B}$. Further, the radial thickness $T_{110}$ of sleeve 110 is preferably between 0.25 in. and 3 in., and more preferably between 0.5 in. and 2.5 in.

Figure 7:
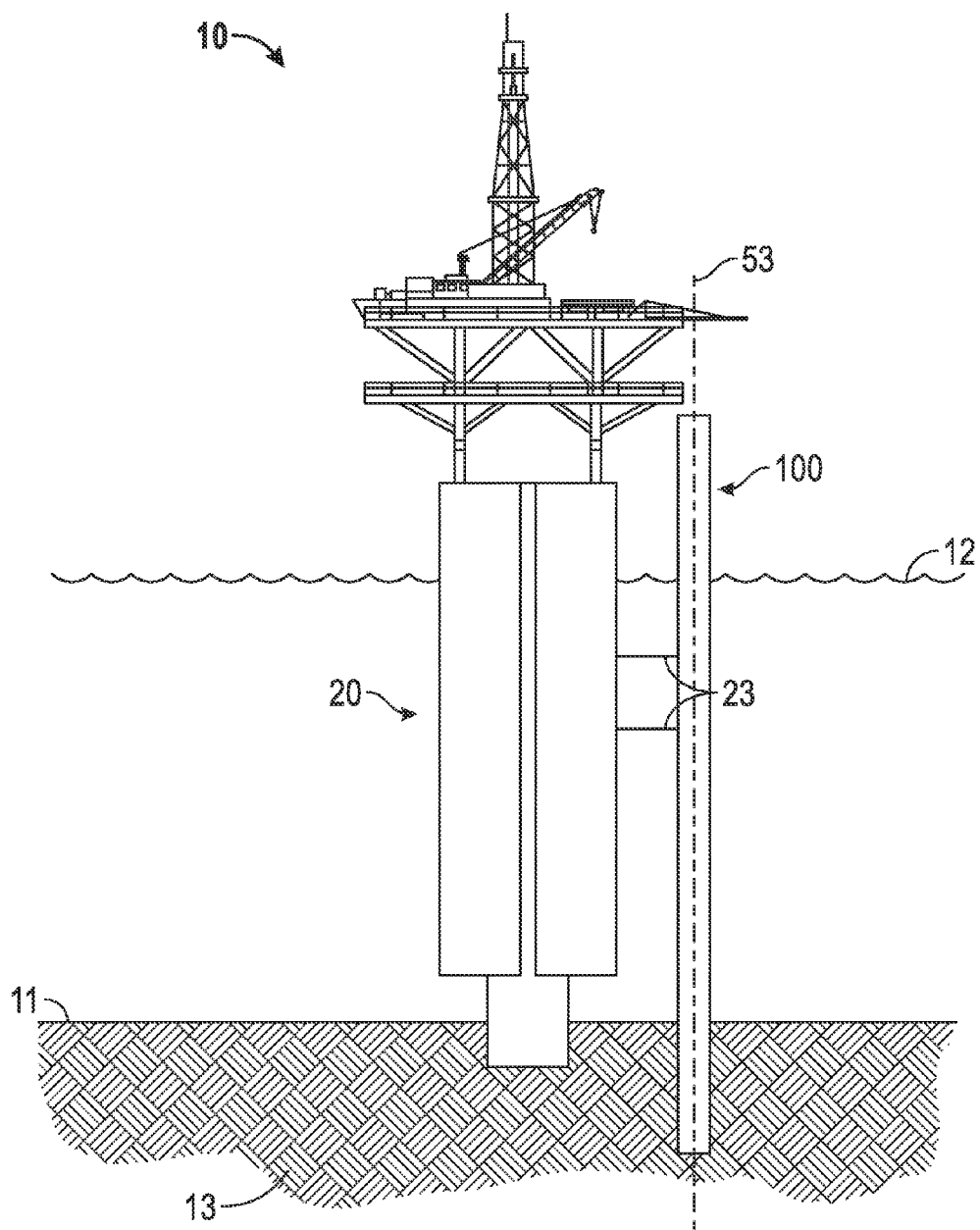
FIGS. 7 and 8 are sequential schematic views of an embodiment of a method for installing the bend restrictor and the conductor of FIG. 3.
Figure 8:
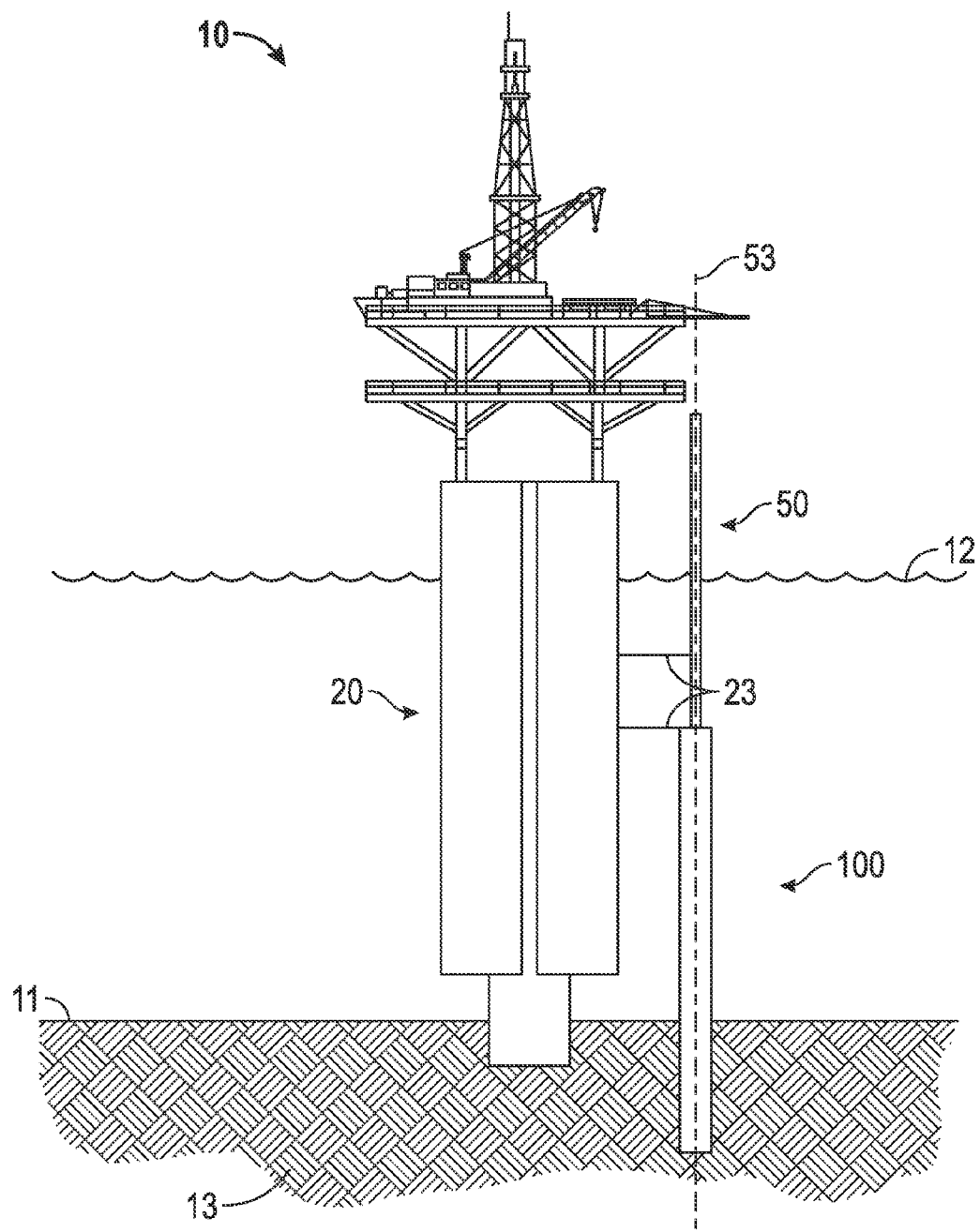

FIGS. 7 and 8 illustrate an exemplary method for installing one bend restrictor 100 and associated conductor 50. Although installation of one bend restrictor 100 and conductor 50 is shown, the remaining bend restrictors 100 and conductors 50 can be installed in the same manner. Referring first to FIG. 7, elongate bend restrictor 100 is vertically oriented and moveably coupled to hull 20 with guide frames 23. Next, bend restrictor 100 is advanced vertically downward into the sea bed 13. In general, conductor 50 can be disposed within bend restrictor 100 prior to installing bend restrictor 100 into the sea bed 13, or run through bend restrictor 100 after it is installed in the sea bed 13.

Referring now to FIG. 8, once restrictor 100 is embedded in the sea bed 13 to the desired depth $L_{110B}$, restrictor 100 is cut at a desired location 105 between the sea floor 11 and below the sea surface 12, thereby exposing conductor between location 105 and upper end 50a. The remaining portion of restrictor 100 restricts bending stresses in conductor 50 as it responds to the movement of structure 10. In general, annulus 103 can be filled with grout or cement 52 prior to or after cutting restrictor 100 at location 105.

Figure 9:
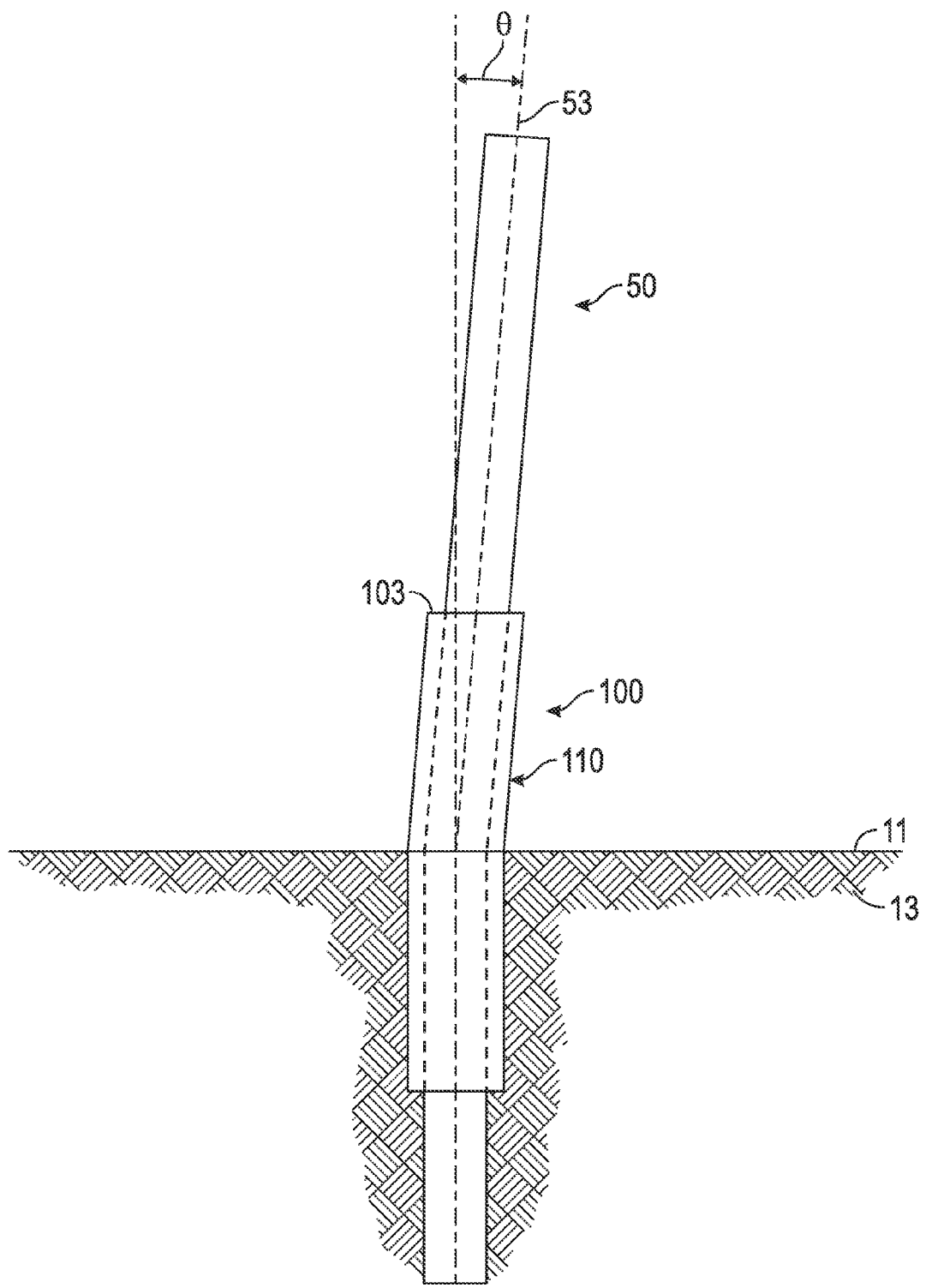
FIG. 9 is a front schematic view of the bend restrictor and the conductor of FIG. 3 experiencing bending stresses.

Referring now to FIG. 9, a schematic view of one restrictor 100 is shown restricting the bending of the associated conductor 50. As conductor 50 bends at or near the sea floor 11 in response to movement of structure 10, bend restrictor 100 provides added support and stability to conductor 50 at the region of bending. As a result, restrictor 100 restricts further bending of conductor 50 and offers the potential to reduce bending stresses experienced by the conductor 50. More specifically, as conductor 50 bends from vertical by an angle θ in response to the movements of structure 10, conductor 50 presses against the cement 52 in annulus 103. As a result, the bending stresses experienced by conductor 50 are transferred to sleeve 110. Further deformation of conductor 50 requires bending of conductor 50 as well as sleeve 110. Thus, the stiffness of sleeve 110 functions to limit further bending (and hence limit bending stresses) experienced by the corresponding conductor 50.

It should be appreciated that although sleeve 110 restricts bending of conductor 50, sleeve 110 and conductor 50 experience some bending. In general, the amount of bending of sleeve 110 and conductor 50 will depend on a variety of factors including the stiffness of sleeve 110 and the size and geometry of sleeve 110. As conductor 50 and sleeve 110 bend in response to the movements of structure 10, bending stresses are experienced by conductor 50 and sleeve 110 since sleeve 110 is forced to bend along with conductor 50. The stiffness and geometry of sleeve 110 is preferably selected to optimize and/or minimize the net bending stresses experienced by conductor 50 and sleeve 110, to reduce the potential for failure of both sleeve 110 and conductor 50.

Figure 10:
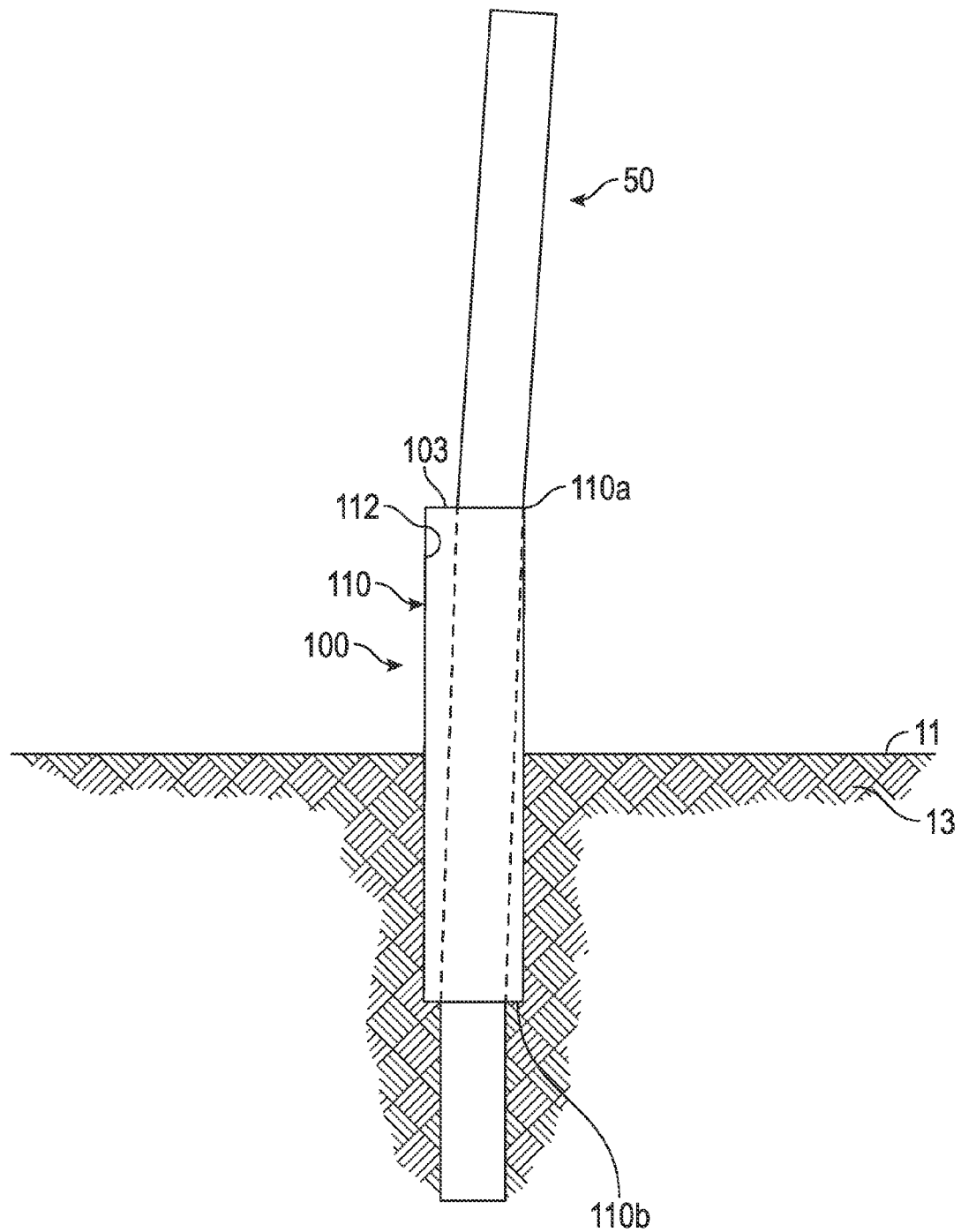
FIG. 10 is a schematic view of a conductor and an embodiment of a bend restrictor in accordance with the principles described herein experiencing bending stresses.
Figure 11:
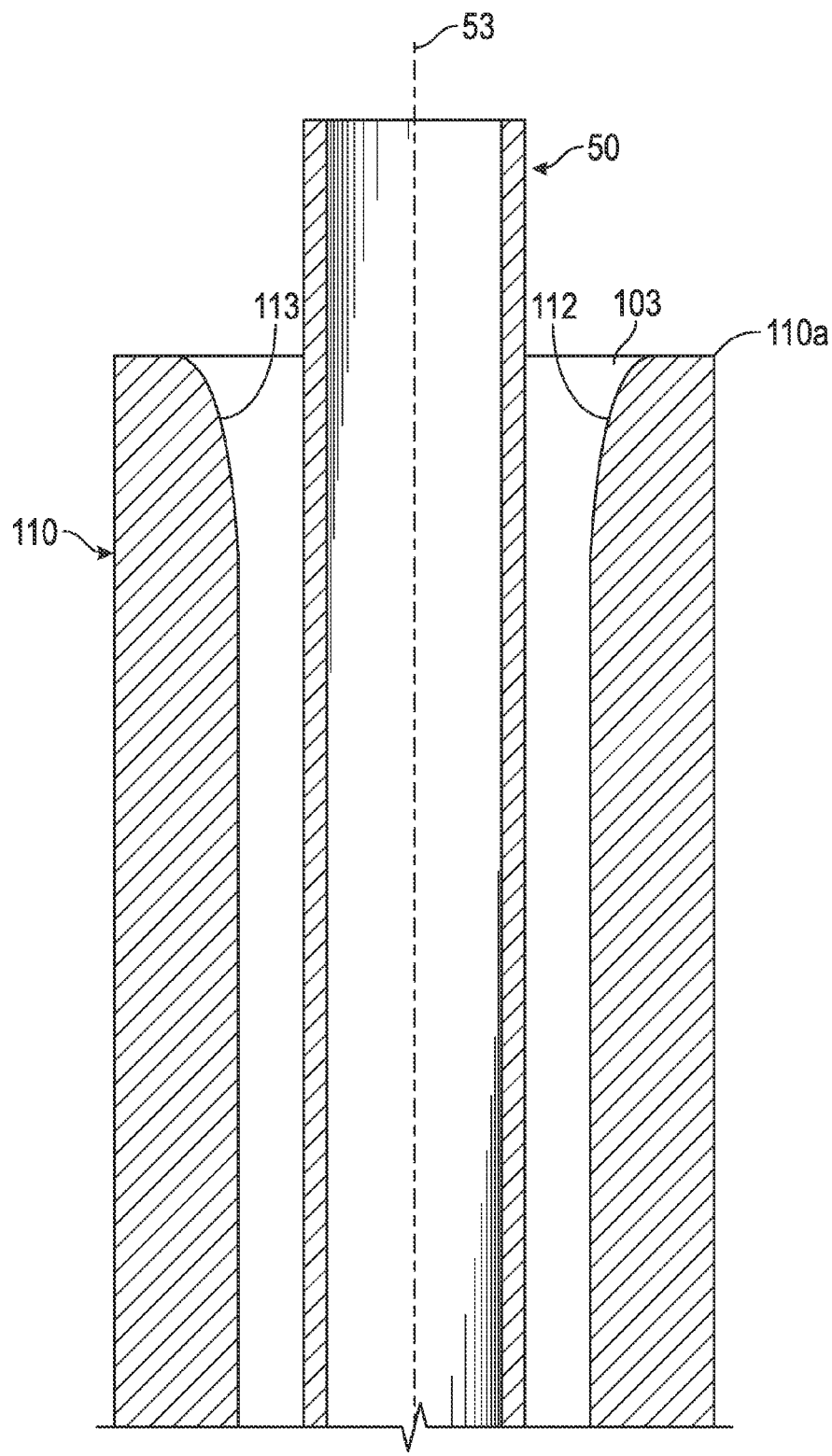
FIG. 11 is a partial cross-sectional view of a conductor and an embodiment of a bend restrictor in accordance with the principles described herein disposed about the conductor.
Figure 12:
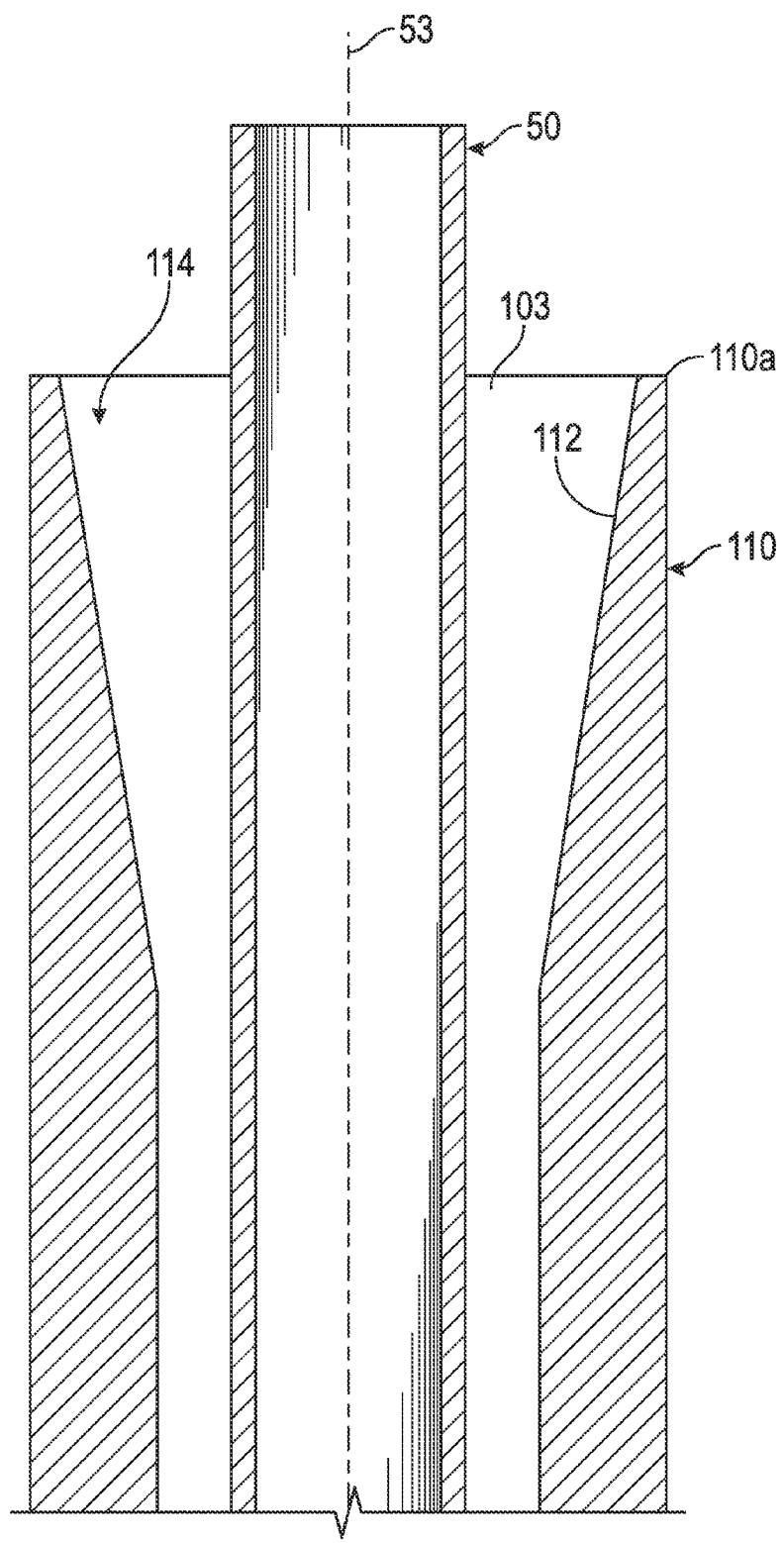
FIG. 12 is a partial cross-sectional view of a conductor and an embodiment of a bend restrictor in accordance with the principles described herein disposed about the conductor.

Referring briefly to FIG. 10, in some embodiments, annulus 103 is not filled with cement 52 or other rigid material. In such embodiments, conductor 50 is free to bend on its own within sleeve 110 until conductor 50 engages inner surface 112 of sleeve 110. Since upper portion 50c of conductor 50 bends relative to lower portion 50d of conductor 50 (at or near the sea floor 11), conductor 50 will typically first contact the inner surface 112 of sleeve 110 at or near upper end 110a. Once conductor 50 engages the inner surface 112 of sleeve 110, continued bending of conductor 50 requires bending of both conductor 50 and sleeve 110. To reduce bending stresses and the potential for kinking of conductor 50 upon engagement of upper end 110a, the contact surface area between conductor 50 and end 110a are preferably maximized to minimize and/or eliminate sharp edges at the point of contact between sleeve 110 and conductor 50. In particular, in such embodiments, inner surface 112 at upper end 110a of sleeve 110 preferably comprises a smoothly contoured convex annular surface 113 as is shown in FIG. 11, or a frustoconical surface 114 as is shown in FIG. 12.

Referring again generally to FIG. 5, the size and geometry (e.g., axial length, radial thickness, inside diameter, etc.) of restrictor 100 and the material composition of restrictor 100 (e.g., steel, aluminum, composite, etc.) are preferably selected to reduce the maximum bending stresses in conductor 50 (as compared to the unrestricted bending of conductor 50) while simultaneously maintaining the maximum bending stresses induced in restrictor 100 below the ultimate material strength of restrictor 100. Without being limited by this or any particular theory, the maximum bending stresses in conductor 50 and restrictor 100 depend, at least in part, on the movement of structure 10, which depends on the maximum environmental loads exerted on structure 10 (e.g., wind, wave, and current loads). There are several techniques or methods for adjusting the stiffness of bend restrictor 100. These methods generally include, but are not limited to, altering the geometry of sleeve 110 (e.g., radial thickness, length $L_{110A}$, $L_{110B}$, diameter, etc.), and selecting a different material (i.e., Young's modulus) for restrictor 100.

Figure 13:
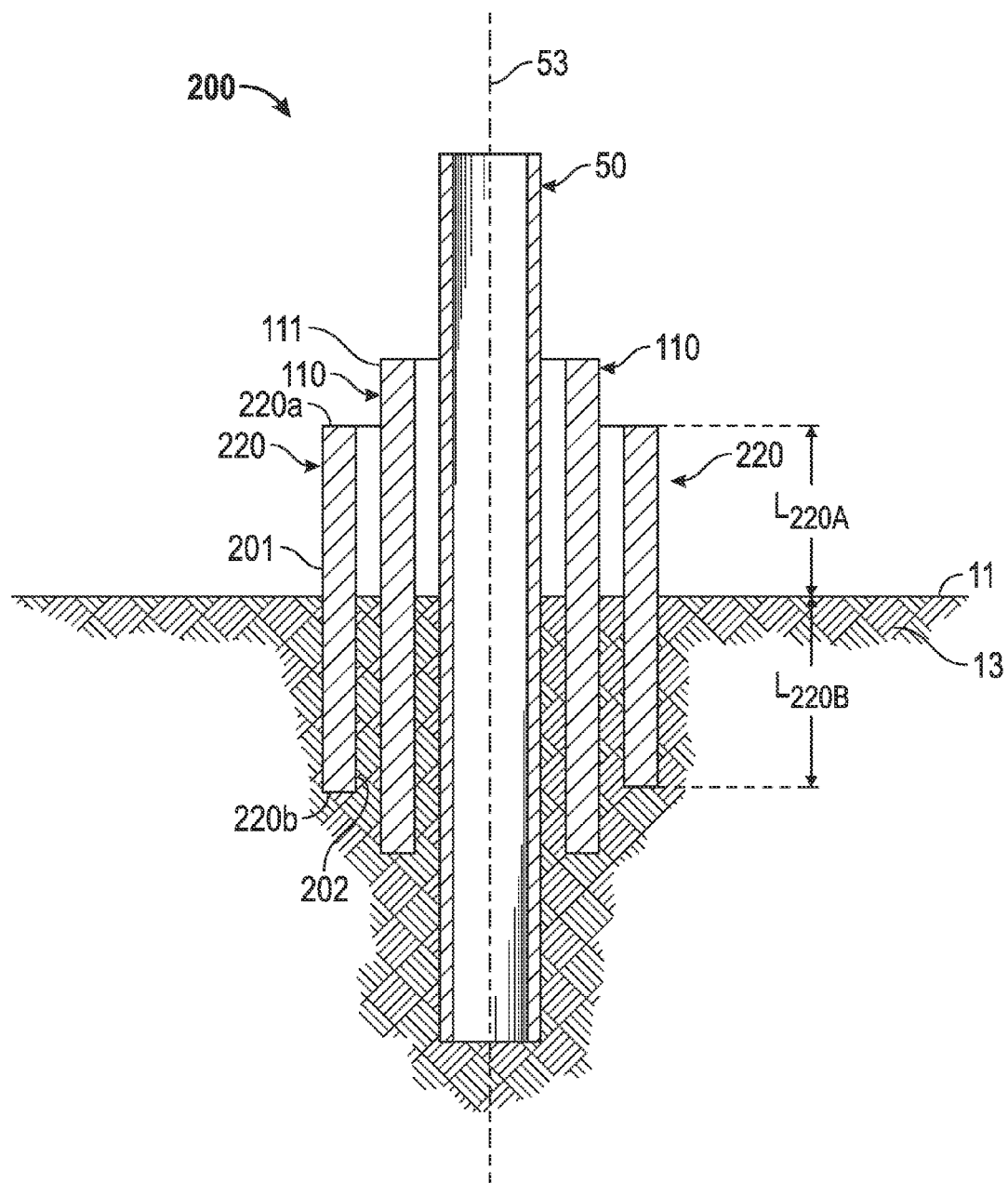
FIG. 13 is a cross-sectional view of a conductor and an embodiment of a bend restrictor in accordance with the principles described herein disposed about the conductor.
Figure 14:
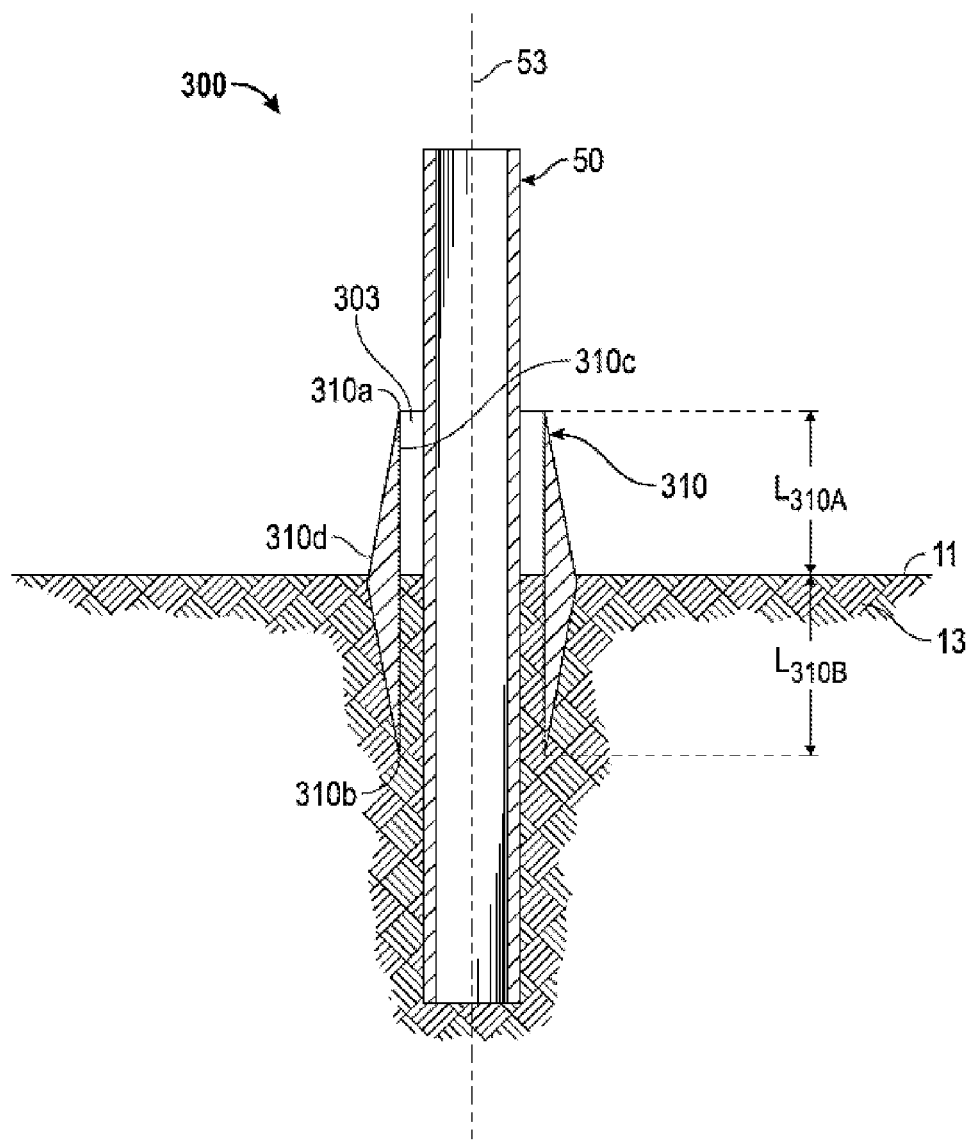
FIG. 14 is a cross-sectional view of a conductor and an embodiment of a bend restrictor in accordance with the principles described herein disposed about the conductor.

Referring now to FIGS. 13 and 14, embodiments of bend restrictors 200, 300 are schematically shown. In these embodiments, the stiffness of bend restrictors 200, 300 are controlled and adjusted by varying the radial thickness of bend restrictors 200, 300 along their lengths. In particular, bend restrictors 200, 300 have non-uniform radial thickness along their lengths.

Referring first to FIG. 13, bend restrictor 200 is shown disposed about one conductor 50 to strengthen conductor 50 at the sea floor 11 (i.e., at the location where conductor 50 is subjected to the greatest bending stress). Bend restrictor 200 comprises cylindrical sleeve 110 disposed about conductor 50, each as previously described. However, in this embodiment, restrictor 200 also includes a second or outer cylindrical sleeve 220 disposed about sleeve 110. Outer sleeve 220 is coaxially aligned with sleeve 110 and conductor 50 and has a first or upper end 220a disposed above the sea floor 11, a second or lower end 220b disposed below the sea floor 11 (i.e., disposed in the sea bed 13), a cylindrical outer surface 201 extending between ends 220a, b, and a cylindrical inner surface 202 extending between ends 220a, b. In addition, sleeve 220 has a first portion extending between the sea floor 11 and upper end 220a having a first axial length $L_{220A}$, a second portion extending between sea floor 11 and lower end 220b having a second axial length $L_{220B}$, and a radial thickness $T_{220}$ measured radially between surfaces 201, 202.

In this embodiment, the inner diameter of sleeve 220 is greater than the outer diameter of sleeve 110, and thus, an annulus 203 is formed between the outer surface 111 of sleeve 110 and the inner surface 202 of sleeve 220. Annulus 203 is filled with cement or grout 52; however, in other embodiments, annulus 203 may be left substantially empty or filled with other materials as described above with respect to annulus 103. Although an annulus 203 is provided between sleeves 110, 220 in this embodiment, in other embodiments, the inner diameter of sleeve 220 and outer diameter of sleeve 110 may be sized such that surfaces 202, 111 slidingly engage (i.e., there is no annulus between sleeves 110, 220).

For most applications, axial lengths $L_{220A}$, $L_{220B}$ of sleeve 220 are each preferably between 10 and 100 ft., more preferably between 20 and 75 ft., and even more preferably 50 ft. The axial length $L_{220A}$ is preferably about the same as the axial length $L_{220B}$, but such symmetry is not required under the general principles of the current invention. Further, radial thickness $T_{220}$ of sleeve 220 is preferably between 0.25 in. and 3 in., and more preferably between 0.5 in. and 2.5 in. However, $T_{220}$ may exist above or below these stated values while still substantially complying with the principles of the current invention.

As previously described, conductor 50 bends at or near the sea floor 11 in response to movement of structure 10. As conductor 50 bends, restrictor 200 provides added support and stability to conductor 50 at the region of bending, thereby restricting conductor 50 from bending and offering the potential to reduce bending stresses in conductor 50. Outer sleeve 220 provides some added stiffness at or nearest to the pivot point of conductor 50 (i.e. at or near the sea floor 11). Specifically, as conductor 50 bends in response to the movements of structure 10, the bending stresses experienced by conductor 50 are counteracted by the combined stiffness of the sleeve 110 and outer sleeve 220. Because both conduit 50 and restrictor 200 are fixed at the sea floor 11, the bending stresses will reach a maximum value at this point. In order to effectively alleviate this heightened stress, restrictor 200 provides a greater level of stiffness at or near the sea floor 11 of conductor 50 by providing outer sleeve 220 about sleeve 110 at or near this pivot point. Therefore, the current embodiment allows for the stiffness of restrictor 200 to be varied along its axial length such that it is greatest at the point in which the conductor 50 experiences the highest bending stresses.

Referring now to FIG. 14, bend restrictor 300 is shown disposed about one conductor 50 to strengthen conductor 50 at the sea floor 11. In this embodiment, bend restrictor 300 comprises a sleeve 310 which is disposed about conductor 50.

In particular, sleeve 310 is coaxially aligned with conductor 50 and has a first or upper end 310a disposed above the sea floor 11, a second or lower end 310b disposed below the sea floor 11 in the sea bed 13, a cylindrical inner surface 310c extending between ends 310a, b, and an outer surface 310d extending between ends 310a, b. In addition, sleeve 310 has a first portion with a first axial length $L_{310A}$ measured between the sea floor 11 and upper end 310a, a second portion having a second axial length $L_{310B}$ measured between the sea floor 11 and lower end 310b, and a radial thickness $T_{310}$ measured radially between surfaces 310c, d. In this embodiment, the radial thickness $T_{310}$ of sleeve 310 varies along the length of sleeve 310. In particular, the radial thickness $T_{310}$ is greatest in the central region of sleeve 310 (i.e., at sea floor 11), and generally decreases moving axially to each end 310a, b. Therefore, at ends 310a, b, where the radial thickness $T_{310}$ is a minimum, sleeve 310 has a lower stiffness, while stiffness of sleeve 310 is maximized near the central region where $T_{310}$ is relatively thick.

As shown in FIG. 14, the inner diameter of sleeve 310 is greater than the outer diameter of conductor 50, thereby resulting in an annulus 303 therebetween. Annulus 303 may be filled with cement or grout 52, or other material as previously described. In other embodiments, annulus 303 may be filled with sea water above the sea floor 11 and soil below the sea floor.

For most applications, axial lengths $L_{310A}$, $L_{310B}$ of sleeve 310 are each preferably between 10 and 100 ft., more preferably between 20 and 75 ft., and even more preferably 50 ft. The axial length $L_{310A}$ is preferably about the same as the axial length $L_{310B}$. Further, the radial thickness $T_{310}$ of sleeve 310 is preferably ranges between 0.25 in. and 3 in., and more preferably between 0.5 in. and 2.5 in.

As previously described, conductor 50 bends at or near the sea floor 11 in response to movement of structure 10. As conductor 50 bends, restrictor 300 provides added support and stability to conductor 50 at the region of bending, thereby restricting conductor 50 from bending and offering the potential to reduce bending stresses in conductor 50. However, in this embodiment, outer sleeve 310 provides additional stiffness at or nearest to the pivot point of conductor 50 (i.e. at or near the sea floor 11). Specifically, as conductor 50 bends in response to the movements of structure 10, these bending stresses are counteracted by the stiffness of sleeve 310. Because both conductor 50 and restrictor 300 are fixed at the sea floor 11, the bending stresses will reach a maximum value at this point. In order to effectively alleviate this heightened stress, restrictor 300 provides a greater level of stiffness at or near the sea floor 11 by varying the radial thickness $T_{310}$ of sleeve 310 such that it reaches a maximum in the central region of sleeve 310 at the sea floor 11. Thus, this embodiment of restrictor 300 has a stiffness that varies along its axial length such that it is greatest at the point in which the conductor 50 experiences the greatest bending stresses.

As previously described, the stiffness of embodiments of bend restrictors described herein (e.g., bend restrictors 100, 200, 300, etc.) can be tailored and varied along their lengths by varying their radial thickness or effective radial thickness. The stiffness of bend restrictors described herein can also be tailored and varied by selecting different materials for the sleeves (e.g., sleeves 110, 220, 310, etc.). As is known in the art, the Young's modulus of a particular material is a measure of the stiffness of an elastic material. Specifically, it is the ratio of stress to strain during elastic deformation of a given material. As a result, a lower value of Young's modulus correlates to a lower stiffness, while a higher value of Young's modulus correlates to a relatively higher stiffness. Thus, by selecting different materials having different Young's moduli, the stiffness of the sleeves can be controlled and varied for a given size and geometry. For most applications, the sleeves (e.g., sleeves 110, 220, 310, etc.) are preferably made of metals or metal alloys (e.g., aluminum, steel, titanium, etc.) or a composite. Conductor 50 is typically made of steel, and thus, selection of any material other than steel for the sleeves will result in the bend restrictor having a different Young's modulus than that of the conductor 50.

Figure 15:
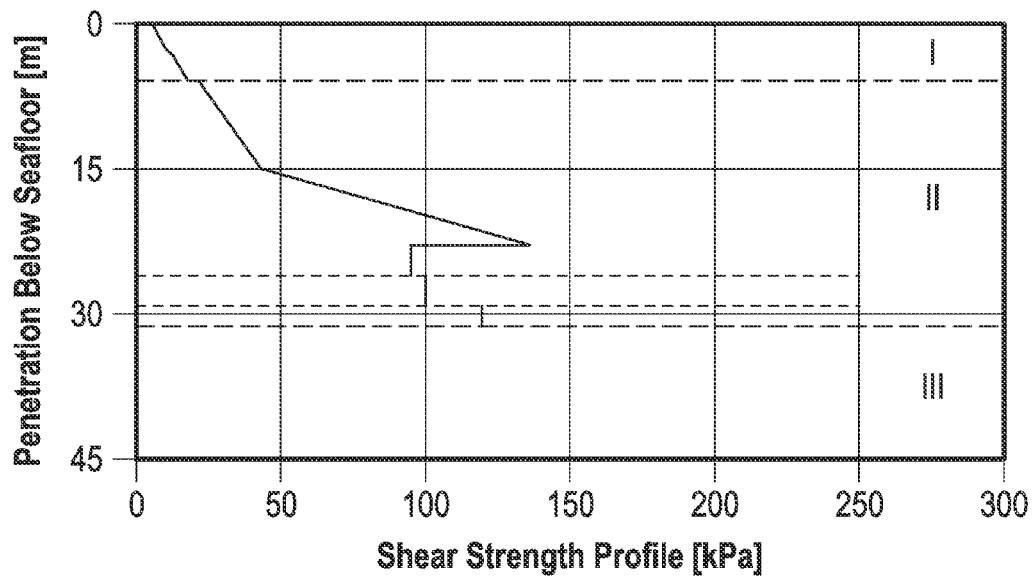
FIG. 15 is a graphical illustration of the shear strength profile of the soil at the sea bed used in a model to evaluate the bending stresses induced in various configurations of the conductor and the bend restrictor of FIG. 3.

Referring now to FIGS. 15-21. To analyze and evaluate the operation and potential benefits of embodiments of bend restrictor 100 disposed about conductor 50 previously described, structure 10, and various configurations of conductor 50 and restrictor 100 were modeled in ABAQUS global model and subjected to a 100 year wave event. The parameters of structure 10 modeled are shown in Table 1 below. The stiffness profile of the soil in sea bed 13 included in the model is shown in FIG. 15.

TABLE 1

| Modeled Parameters of Structure 10 | |
|---|---|
| Number of columns | 4 |
| Column diameter | 8.4 m |
| Column length | 60.1 m |
| Suction can diameter | 8.4 m |
| Suction can length | 9 m |
| Sea floor penetration | 1 m |
| Total hull length | 69.1 m |
| Freeboard | 7.7 m |
| Total hull weight | 2108 metric tons |
| Total topside weight | 2000 metric tons |
| Total topside wind area | 866 m$^2$ |
| Total topside height | 14.5 m |

Figure 16:
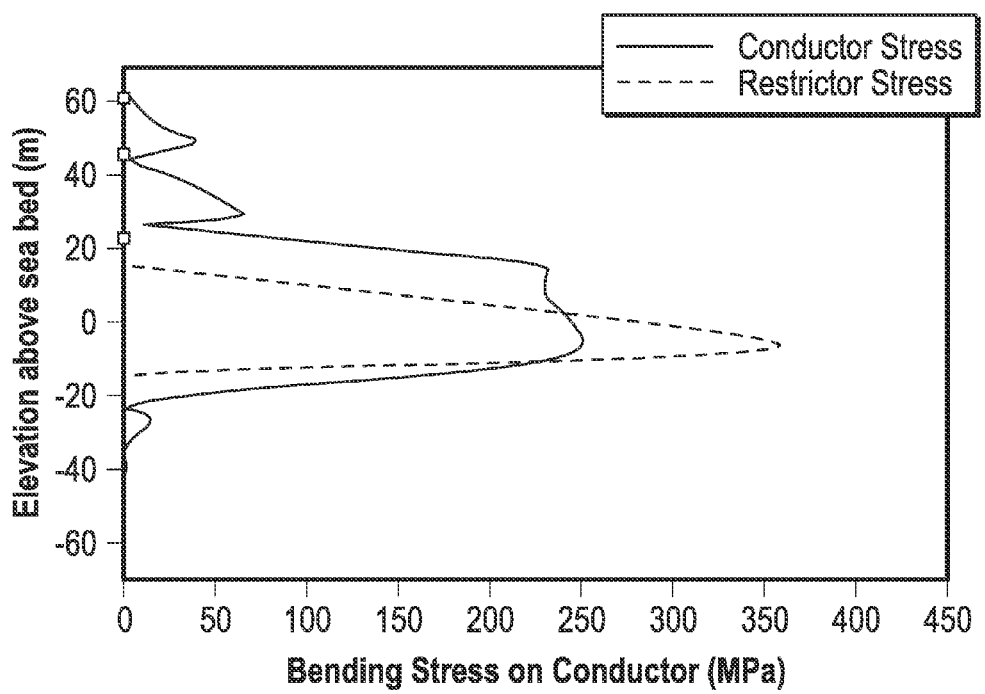
FIGS. 16-21 are graphical illustrations of the bending stresses induced in various configurations of the conductor and the bend restrictor of FIG. 5 during a 100 year wave event.
Figure 17:
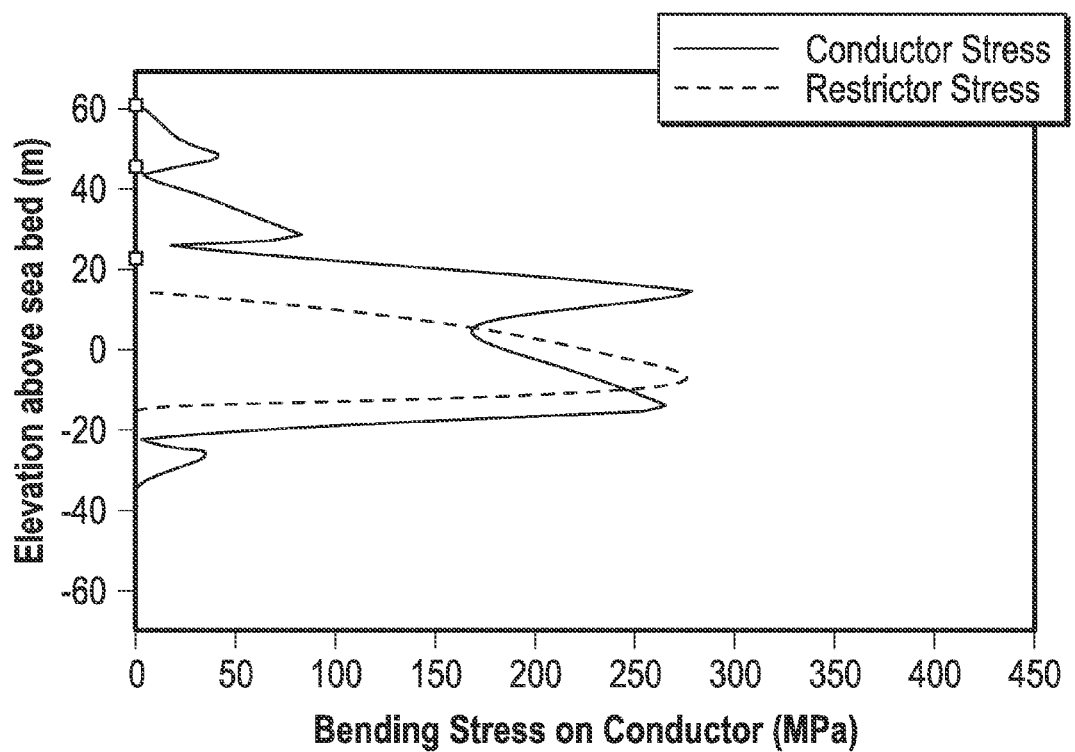

Referring to FIGS. 16 and 17, a pair of graphs depicting the bending stress exerted on both a bend restrictor 100 and associated conductor 50 coupled to structure 10 subjected to a 100 year wave are shown. The bend restrictor 100 and conductor 50 modeled in FIGS. 16 and 17 were identical except for the outer diameter and the radial thickness of bend restrictor 100. Thus, FIGS. 16 and 17 illustrate the difference in bending stresses experienced by bend restrictor 100 and conductor 50 due solely to differences in the outer diameter and the radial thickness of bend restrictor 100. More specifically, conductor 50 modeled in FIGS. 16 and 17 had an outer diameter of 21.1 in. and a radial thickness of 1.0 in., bend restrictor 100 modeled in FIG. 16 had an outer diameter of 24.0 in. and a radial thickness of 1.0 in., and bend restrictor 100 modeled in FIG. 17 had an outer diameter of 25.60 in. and a radial thickness of 1.75 in. Thus, the inner diameter of bend restrictor 100 modeled in FIGS. 16 and 17 were substantially the same. The conductor 50 and bend restrictor 100 modeled in FIGS. 16 and 17 were each made of steel.

As can be seen by comparing the graphs in FIGS. 16 and 17, the overall stiffness of the bend restrictor 100 was increased by increasing its outer diameter and radial thickness, while the inner diameter of the bend restrictor 100 was substantially the same. As a result, while the maximum bending stresses on conductor 50 reached a slightly higher maximum value at its ends, the bending stresses experienced by restrictor 100 and the bending stresses exerted on the conductor 50 near the sea floor 11 were reduced.

Figure 18:
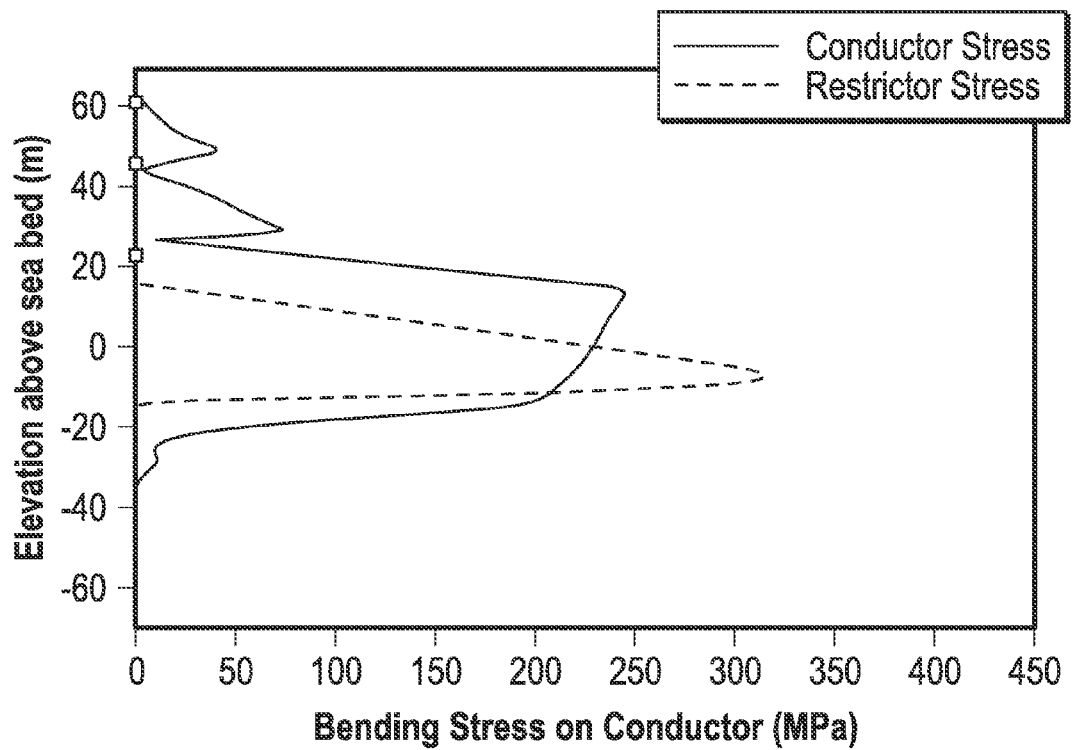

Referring to FIGS. 16 and 18, another pair of graphs depicting the bending stress exerted on a conductor 50 and a bend restrictor 100 coupled to a structure 10 subjected to a 100 year wave are shown. The bend restrictor 100 and conductor 50 modeled in FIGS. 16 and 18 were identical except for the outer diameter and the inner diameter of bend restrictor 100. Thus, FIGS. 16 and 18 illustrate the difference in bending stresses experienced by bend restrictor 100 and conductor 50 due solely to differences in the outer diameter and the inner diameter of bend restrictor 100. More specifically, conductor 50 modeled in FIGS. 16 and 18 had an outer diameter of 21.1 in. and a radial thickness of 1.0 in., bend restrictor 100 modeled in FIG. 16 had an outer diameter of 24.0 in. and a radial thickness of 1.0 in., and bend restrictor 100 modeled in FIG. 17 had an outer diameter of 28.1 in. and a radial thickness of 1.00 in. Thus, the radial thicknesses of bend restrictor 100 modeled in FIGS. 16 and 18 were the same. The conductor 50 and bend restrictor 100 modeled in FIGS. 16 and 18 were each made of steel.

As can be seen by comparing the graphs in FIGS. 16 and 18, the overall stiffness of the bend restrictor 100 was increased by increasing its inner and outer diameters while maintaining the same radial thickness. As a result, the maximum bending stresses experienced by both the restrictor 100 as well as the conductor 50 were reduced.

Figure 19:
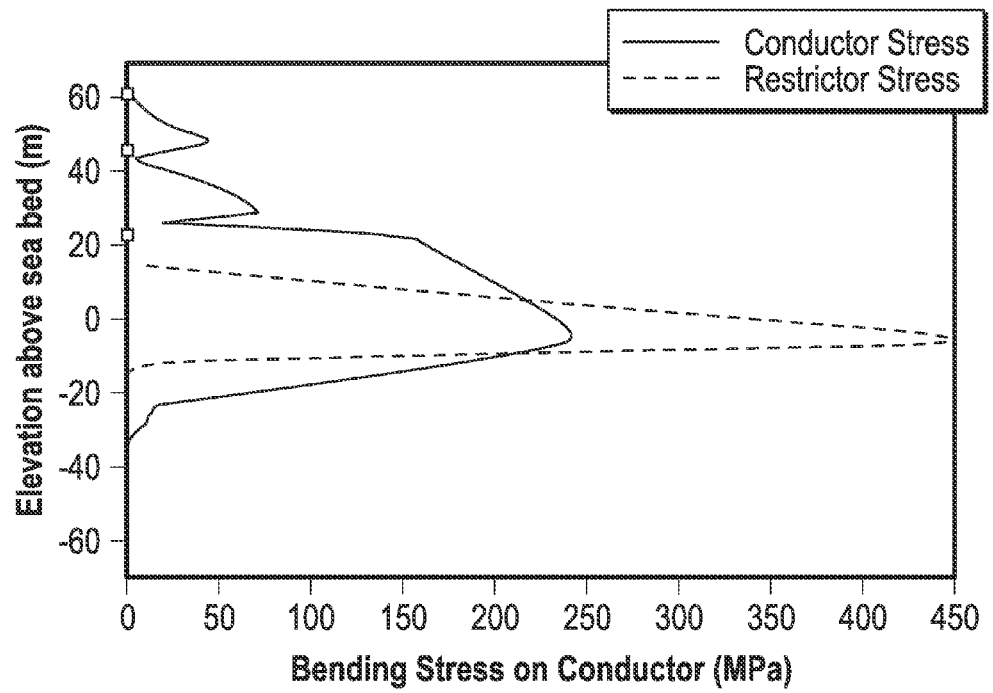
Figure 20:
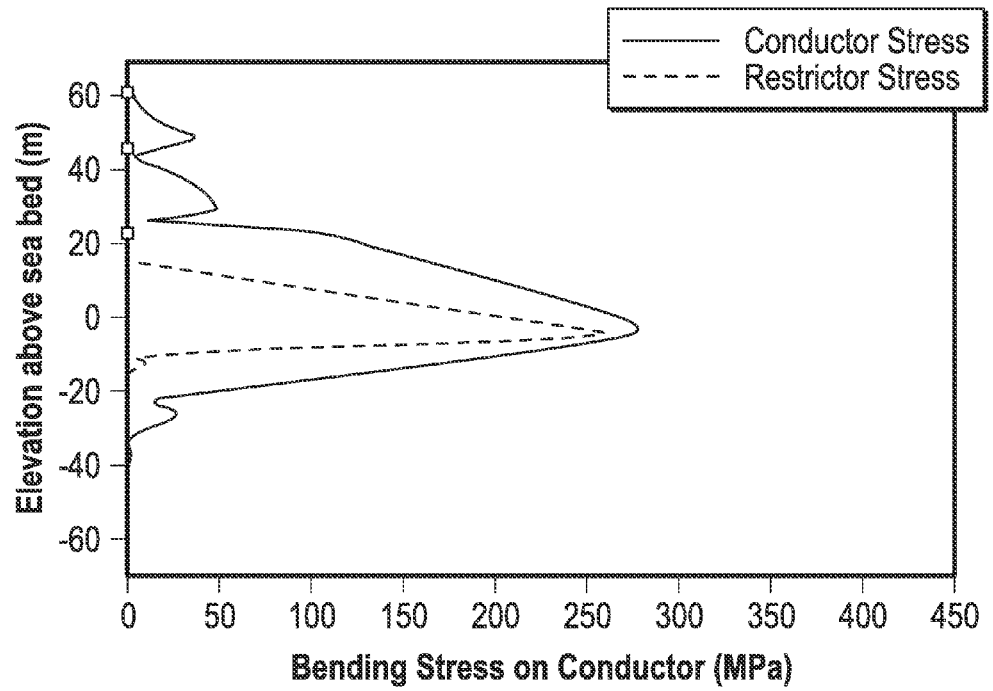
Figure 21:
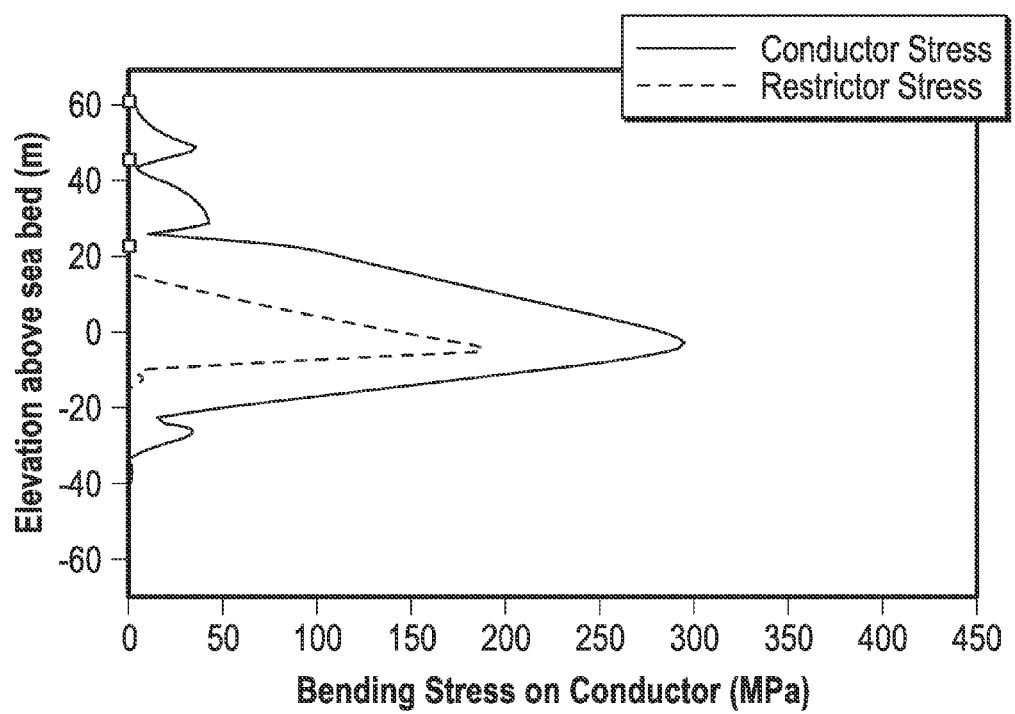

Referring now to FIGS. 19-21, another set of graphs depicting the bending stress exerted on a conductor 50 and a bend restrictor 100 coupled to a structure 10 subjected to a 100 year wave are shown. The bend restrictor 100 and conductor 50 modeled in FIGS. 19-21 were identical except for the material composition of bend restrictor 100. Thus, FIGS. 19-21 illustrate the difference in bending stresses experienced by bend restrictor 100 and conductor 50 due solely to differences in the material composition, and hence Young's modulus, of bend restrictor 100. More specifically, conductor 50 modeled in FIGS. 19-21 had an outer diameter of 20.0 in. and a radial thickness of 0.45 in., bend restrictor 100 modeled in FIGS. 19-21 had an outer diameter of 28.0 in. and a radial thickness of 1.0 in. Thus, the outer diameter, inner diameter, and radial thicknesses of conductor 50 modeled in FIGS. 19-21 were the same, and likewise, the outer diameter, inner diameter, and radial thicknesses of bend restrictor 100 modeled in FIGS. 19-21 were the same. Further, conductor 50 modeled in FIGS. 19-21 were each made of steel, however, bend restrictor 100 modeled in FIG. 19 was made of steel, bend restrictor 100 modeled in FIG. 20 was made of titanium, and bend restrictor 100 modeled in FIG. 21 was made of aluminum. In general, steel has a Young's modulus greater than titanium, which has a Young's modulus greater than aluminum.

As can be seen by comparing the graphs in FIGS. 19-21, by selecting a material that has a lower value of Young's modulus (i.e., titanium and aluminum, respectively, compared to steel), FIGS. 20 and 21 show greatly reduced bending stresses in bend restrictor 100, and similar or slightly increased bending stresses in conductor 50.

In the manner described, embodiments of bend restrictors described herein can be tailored to provide a desired stiffness for managing bending stresses in an associated conductors and in the bend restrictors themselves. For example, the size and geometry of the bend restrictor can be varied (e.g., inner and outer diameter, length, etc.), the radial thickness (uniform or non-uniform) can be varied, the material composition of the bend restrictor can be varied, or combinations thereof to control the stiffness profile of the bend restrictor to manage bending stresses in the bend restrictor and associated conductor when subjected to bending loads. Although embodiments described herein have been shown in connection with conductors (e.g., conductors 50), it should be appreciated that embodiments of bend restrictors described herein may be used in connection with other types of conduits, tubulars, and conductors subjected to bending loads. For example, embodiments of bend restrictors described herein can be used in connection with risers, piping, or the support tendons on a tension leg platform.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An offshore system for drilling or production, the system comprising:
    a buoyant hull;
    a topside mounted to the hull and positioned above the surface of the water;
    a conductor having a lower end disposed in the sea bed below the sea floor and an upper end coupled to the topside;
    a bend restrictor comprising a first sleeve disposed about the conductor, wherein the first sleeve has a central axis, a lower end positioned in the sea bed below the sea floor, an upper end positioned above the sea floor, a lower portion extending axially from the sea floor to the lower end, and an upper portion extending axially from the sea floor to the upper end;
    wherein the upper portion has a first axial length, and the second portion has a second axial length that is the same as the first axial length.

2. The offshore system of claim 1, wherein the conductor has an outer diameter that is less than an inner diameter of the first sleeve.

3. The offshore system of claim 2, wherein an annulus between the conductor and the first sleeve is filled with a rigid material configured to secure the conductor and the first sleeve to one another.

4. The offshore system of claim 3, wherein the rigid material is concrete or grout.

5. The offshore system of claim 1, wherein the first sleeve has a cylindrical inner surface extending between the upper end and the lower end.

6. The offshore system of claim 5, wherein the first sleeve has a non-uniform radial thickness.

7. The offshore system of claim 6, wherein the first sleeve has a radial thickness that is a maximum at the sea floor and decreases moving axially from the sea floor toward each of the upper end and the lower end.

8. The offshore system of claim 5, wherein the first sleeve is made of steel, aluminum, or titanium.

9. The offshore system of claim 1, wherein the bend restrictor further comprises a second sleeve disposed about the first sleeve.

10. The offshore system of claim 9, wherein the second sleeve has an upper end disposed above the sea floor and a lower end disposed below the sea floor;
    wherein the second sleeve has a central axis, an upper portion extending axially from the sea floor to the upper end of the second sleeve and a lower portion extending axially from the sea floor to the lower end of the second sleeve, wherein the upper portion of the second sleeve has a first axial length and the lower portion of the second sleeve has a second axial length that is the same as the first axial length of the upper portion of the second sleeve.

11. The offshore system of claim 1, wherein the first sleeve has a radial thickness between 0.25 in. and 3 in.

12. The offshore system of claim 11, wherein the first sleeve has an axial length measured between the upper end and the lower end, wherein the axial length is greater than 10 m.

13. A method for reducing bending stresses in a subsea conductor, the method comprising:
    penetrating the sea floor with a bend restrictor;
    advancing the bend restrictor vertically into the sea floor, wherein the bend restrictor has a central axis, an upper end disposed above the sea floor, a lower end disposed below the sea floor, a lower portion extending axially from the sea floor to the lower end, and an upper portion extending axially from the sea floor to the upper end, wherein the upper portion has a first axial length, and the lower portion has a second axial length that is the same as the first axial length;
    cutting the bend restrictor at a location above the sea floor;
    extending the conductor through the bend restrictor;
    radially spacing the bend restrictor from the conductor;
    bending the conductor; and
    restricting bending of the conductor with the restrictor.

14. The method of claim 13, further comprising:
    filling an annulus between the conductor and the bend restrictor with a rigid material to secure the conductor and the bend restrictor to one another.

15. The method of claim 13, further comprising coupling the conductor to a buoyant hull of an offshore structure.

16. A bend restrictor for restricting bending of a conductor extending into the sea floor, the bend restrictor comprising:
    a sleeve disposed about the conductor, wherein the sleeve has a central axis, a lower end positioned in the sea bed below the sea floor and an upper end positioned above the sea floor;
    wherein the sleeve has an inner diameter greater than an outer diameter of the conductor;
    wherein the sleeve has a first portion extending from the sea floor to the upper end and a second portion extending from the sea floor to the lower end;
    wherein the first portion has a first axial length and the second portion has a second axial length that is the same as the first axial length; and
    wherein the sleeve has a radial thickness that is a maximum at the sea floor and decreases moving axially from the sea floor toward each of the upper end and the lower end.

17. The bend restrictor of claim 16, wherein an annulus between the conductor and the bend restrictor is filled with a rigid material configured to secure the conductor and the bend restrictor to one another.

18. The bend restrictor of claim 16, wherein the sleeve has a cylindrical inner surface extending between the upper end and the lower end.

19. The bend restrictor of claim 16, wherein the sleeve has a radial thickness between 0.25 in. and 3 in. and an axial length measured between the upper end and the lower end, wherein the axial length is greater than 10 m.

20. The bend restrictor of claim 16, wherein the bend restrictor comprises an inner sleeve disposed about the conductor and an outer sleeve disposed about the inner sleeve.

* * * * *